United States Patent
Mitu et al.

(10) Patent No.: US 9,563,433 B1
(45) Date of Patent: Feb. 7, 2017

(54) SYSTEM AND METHOD FOR CLASS-BASED EXECUTION OF AN INSTRUCTION BROADCASTED TO AN ARRAY OF PROCESSING ELEMENTS

(71) Applicant: Allsearch Semi LLC, Green Oaks, IL (US)

(72) Inventors: Bogdan Mitu, Campbell, CA (US); Lazar Bivolarksi, Cupertino, CA (US); Gheorghe Stefan, Goffstown, NH (US)

(*) Notice: Subject to any disclaimer, the term of this patent is extended or adjusted under 35 U.S.C. 154(b) by 952 days.

(21) Appl. No.: 13/719,119

(22) Filed: Dec. 18, 2012

Related U.S. Application Data

(63) Continuation-in-part of application No. 11/897,672, filed on Aug. 30, 2007.
(Continued)

(51) Int. Cl.
  *G06F 9/38* (2006.01)
  *G06F 9/50* (2006.01)
  (Continued)

(52) U.S. Cl.
  CPC ......... *G06F 9/3885* (2013.01); *G06F 9/30043* (2013.01); *G06F 9/3836* (2013.01);
  (Continued)

(58) Field of Classification Search
  CPC .... G06F 9/3836; G06F 9/3851; G06F 9/3887; G06F 9/3889; G06F 9/3891; G06F 15/80; G06F 15/8007; G06F 9/5061
  See application file for complete search history.

(56) References Cited

U.S. PATENT DOCUMENTS

| 4,575,818 A | 3/1986 | Almy et al. |
| 4,780,811 A | 10/1988 | Aoyama et al. |

(Continued)

FOREIGN PATENT DOCUMENTS

| JP | 04-291659 | 10/1992 |
| JP | 06-068053 | 3/1994 |

(Continued)

OTHER PUBLICATIONS

Shen et al., "Modern Processor Design—Fundamentals of Superscalar Processors", Beta Edition, 2002, p. 175.*
(Continued)

*Primary Examiner* — David J Huisman
(74) *Attorney, Agent, or Firm* — Haverstock & Owens LLP

(57) ABSTRACT

The present invention is a data parallel system which is able to utilize a very high percentage of processing elements. In an embodiment, the data parallel system includes an array of processing elements and multiple instruction sequencers. Each instruction sequencer is coupled to the array of processing elements by a bus and is able to send an instruction to the array of processing elements. The processing elements are separated into classes and only execute instructions that are directed to their class, although all of the processing elements receive each instruction. In another embodiment, the data parallel system includes an array of processing elements and an instruction sequencer where the instruction sequencer is able to send multiple instructions. Again, the processing elements are separated in classes and execute instructions based on their class.

22 Claims, 5 Drawing Sheets

Related U.S. Application Data

(60) Provisional application No. 60/841,888, filed on Sep. 1, 2006.

(51) Int. Cl.
  *G06F 15/80* (2006.01)
  *G06F 9/30* (2006.01)

(52) U.S. Cl.
  CPC .......... *G06F 9/3851* (2013.01); *G06F 9/5061* (2013.01); *G06F 15/80* (2013.01)

(56) References Cited

U.S. PATENT DOCUMENTS

| | | | |
|---|---|---|---|
| 4,876,644 A | | 10/1989 | Nuechterlein et al. |
| 4,907,148 A | | 3/1990 | Morton |
| 4,983,958 A | | 1/1991 | Carrick |
| 5,038,386 A | * | 8/1991 | Li .................................. 382/302 |
| 5,122,984 A | | 6/1992 | Strehier |
| 5,150,430 A | | 9/1992 | Chu |
| 5,241,635 A | | 8/1993 | Papadopoulos et al. |
| 5,319,762 A | | 6/1994 | Mayer |
| 5,329,405 A | | 7/1994 | Hou et al. |
| 5,373,290 A | | 12/1994 | Lempel et al. |
| 5,440,753 A | | 8/1995 | Hou et al. |
| 5,446,915 A | | 8/1995 | Pierce |
| 5,448,733 A | | 9/1995 | Satoh et al. |
| 5,475,856 A | * | 12/1995 | Kogge ............................. 712/20 |
| 5,497,488 A | | 3/1996 | Akizawa et al. |
| 5,588,152 A | * | 12/1996 | Dapp et al. ...................... 712/16 |
| 5,602,764 A | | 2/1997 | Eskandari-Gharnin |
| 5,640,582 A | | 6/1997 | Hays et al. |
| 5,682,491 A | | 10/1997 | Pechanek et al. |
| 5,758,176 A | | 5/1998 | Agarwal et al. |
| 5,818,873 A | | 10/1998 | Wall et al. |
| 5,828,593 A | | 10/1998 | Schultz et al. |
| 5,828,894 A | * | 10/1998 | Wilkinson et al. .............. 712/20 |
| 5,870,619 A | | 2/1999 | Wilkinson et al. |
| 5,963,210 A | | 10/1999 | Lewis et al. |
| 5,963,746 A | | 10/1999 | Barker et al. |
| 6,088,044 A | | 7/2000 | Kwok et al. |
| 6,089,453 A | | 7/2000 | Kayser et al. |
| 6,128,720 A | * | 10/2000 | Pechanek et al. ............... 712/20 |
| 6,145,075 A | | 11/2000 | Henery et al. |
| 6,212,237 B1 | | 4/2001 | Minami et al. |
| 6,295,534 B1 | | 9/2001 | Mann |
| 6,317,819 B1 | | 11/2001 | Morton |
| 6,405,302 B1 | | 6/2002 | Ohsuga et al. |
| 6,542,989 B2 | | 4/2003 | Duranton |
| 6,728,862 B1 | * | 4/2004 | Wilson ................ G06F 9/30032 709/238 |
| 6,745,317 B1 | | 6/2004 | Mirsky et al. |
| 6,772,268 B1 | | 8/2004 | Kristiansen et al. |
| 6,848,041 B2 | | 1/2005 | Pechanek et al. |
| 7,013,302 B2 | | 3/2006 | Modelski et al. |
| 2002/0107990 A1 | | 8/2002 | Johnson et al. |
| 2002/0114394 A1 | | 8/2002 | Ma |
| 2002/0174318 A1 | | 11/2002 | Stuttard et al. |
| 2003/0041163 A1 | | 2/2003 | Rhoades et al. |
| 2003/0085902 A1 | | 5/2003 | Vogelaar et al. |
| 2004/0030872 A1 | | 2/2004 | Schlansker |
| 2004/0071215 A1 | | 4/2004 | Bellers |
| 2004/0215927 A1 | | 10/2004 | Beaumont |
| 2004/0223656 A1 | | 11/2004 | Moreira |
| 2005/0163220 A1 | | 7/2005 | Takakura et al. |
| 2006/0018562 A1 | | 1/2006 | Ruggiero |
| 2008/0059762 A1 | * | 3/2008 | Mitu et al. ...................... 712/13 |
| 2008/0294875 A1 | * | 11/2008 | Lyuh et al. ..................... 712/30 |

FOREIGN PATENT DOCUMENTS

| | | |
|---|---|---|
| JP | 11-345218 | 12/1999 |
| JP | 2001-045523 | 2/2001 |
| JP | 2001-229138 A | 8/2001 |
| WO | 01/53933 | 7/2001 |

OTHER PUBLICATIONS

Bridges, "The GPA Machine: A Generally Partitionable MSIMD Architecture", 1990, pp. 196-203.*

Shaw D E et al: "Active Memory Chip: A Brief Survey and Case Study" Circuits, Systems and Signal Processing, Cambridge, MS, US, vol. 6 No. 2, 1987 pp. 239-258 XP000747239.

Hascsi, Zoltan; Mitu, Bogdan; Petre, Mariana; Stefan, Gheorghe, "High-Level Synthesis of an Enhanced Connex Memory", 1996 IEEE, p. 163-166.

Stefan, G. and Dragnici, F., "Memory Management Unit With a Performant LRU Circuit" Polytechnic Institute of Bucharesi, pp. 89-96.

Stefan, Gheorghe and Malita, Mihaela, "The Splicing Mechanism and the Connex Memory" Technical Univ. of Bucharest, Dept. of Electronics: Univ. of Bucharest, Fac. of Mathematics, pp. 225-229.

Hascsi, Zoltan and Stefan, Gheorghe, The Connex Addressable Memory (C2RAM)* "Politehnica" University of Bucharest, Electronics & Telecommunication Dpdt., pp. 422-425.

Intel, Intel Architecture Software Developer's Manual—vol. 1: Basic Architecture, Chpt. 4, "Procedure Calls, Interrupts, and Exceptions," 1999, 31 pages.

Mitu et al., "A CMOS Implementation of a Connex Memory," 1997 IEEE, pp. 579-582.

Stefan, Denisa and Stefan, Gheorghe, "Bi-thread Microcontroller as Digital Signal Processor," 1997 IEEE, pp. 585-588.

Thiebaut, Dominique and Stefan, Gheorge, "Local Alignments of DNA Sequences with the Connex Engine," 2001, pp. 1-12.

Stefan, Gheorge, Silicon or Molecules? What's the Best for Splicing?, Technical Univ. of Bucharest, Department of Electronics, pp. 1-23.

Stefan, Gheorge, The Connex Memory. A Physical Support for Tree/List Processing, Technical Univ. of Bucharest, Department of Electronics, pp. 1-22.

Stefan, Gheorge and Benea, Robert, Connex Memories & Rewriting Systems, Politehnica Univ. of Bucharest, Department of Electronics, pp. 1-5.

Berrached, Ali et al., A Decoupled Access/Execute Architecture for Efficient Access of Structured Data, PA State University, 1993 IEEE, pp. 438-447.

Office Action mailed on Jun. 19, 2008, U.S. Appl. No. 11/897,798, filed Aug. 30, 2007, Bogdan Mitu et al., 14 pages.

Final Office Action mailed on Nov. 25, 2008, U.S. Appl. No. 11/897,798, filed Aug. 30, 2007, Bogdan Mitu et al., 17 pages.

\* cited by examiner

SYSTEM AND METHOD FOR CLASS-BASED EXECUTION OF AN INSTRUCTION BROADCASTED TO AN ARRAY OF PROCESSING ELEMENTS

RELATED APPLICATION(S)

This Patent Application is a continuation-in-part of co-pending U.S. patent application Ser. No. 11/897,672, filed Aug. 30, 2007, entitled "STREAM PROCESSING ACCELERATOR," which in turn claims priority under 35 U.S.C. §119(e) to U.S. Provisional Patent Application No. 60/841,888, filed Sep. 1, 2006, entitled "INTEGRAL PARALLEL COMPUTATION", both of which are hereby incorporated by reference in their entirety as if set forth herein.

FIELD OF THE INVENTION

The present invention relates to the field of data processing. More specifically, the present invention relates to data processing using a data parallel machine with multiple sequencers each sending an instruction.

BACKGROUND OF THE INVENTION

Computing workloads in the emerging world of "high definition" digital multimedia (e.g. High-Definition Television (HDTV) and High-Definition-Digital Versatile Disc (HD-DVD)) more closely resemble workloads associated with scientific computing, or so called supercomputing, rather than general purpose personal computing workloads. Unlike traditional supercomputing applications, which are free to trade performance for super-size or super-cost structures, entertainment supercomputing in the rapidly growing digital consumer electronic industry imposes extreme constraints of both size, cost and power.

With rapid growth has come rapid change in market requirements and industry standards. The traditional approach of implementing highly specialized integrated circuits (ASICs) is no longer cost effective as the research and development required for each new application specific integrated circuit is less likely to be amortized over the ever shortening product life cycle. At the same time, ASIC designers are able to optimize efficiency and cost through judicious use of parallel processing and parallel data paths. An ASIC designer is free to look for explicit and latent parallelism in every nook and cranny of a specific application or algorithm, and then exploit that in circuits. With the growing need for flexibility, however, an embedded parallel computer is needed that finds the optimum balance between all of the available forms of parallelism, yet remains programmable.

Embedded computation requires more generality/flexibility than that offered by an ASIC, but less generality than that offered by a general purpose processor. Therefore, the instruction set architecture of an embedded computer can be optimized for an application domain, yet remain "general purpose" within that domain.

The current implementations of data parallel computing systems use only one instruction sequencer to send one instruction at a time to an array of processing elements. This results in significantly less than 100% processor utilization, typically closer to the 20%-60% range because many of the processing elements have no data to process or because they have the inappropriate internal state.

SUMMARY OF THE INVENTION

The present invention is a data parallel system which is able to utilize a very high percentage of processing elements.

In an embodiment, the data parallel system includes an array of processing elements and multiple instruction sequencers. Each instruction sequencer (IS) is coupled to the array of processing elements by a bus and is able to send an instruction to the array of processing elements. The processing elements are separated into classes and only execute instructions that are directed to their class, although all of the processing elements receive each instruction. In another embodiment, the data parallel system includes an array of processing elements and an instruction sequencer where the instruction sequencer is able to send multiple instructions. Again, the processing elements are separated into classes and execute instructions based on their class.

DETAILED DESCRIPTION OF THE PREFERRED EMBODIMENT

The present invention maximizes the use of processing elements (PEs) in an array for data parallel processing. In previous implementations of PEs with one sequencer, occasionally the degree of parallelism was small, and many of the PEs were not used. The present invention employs multiple sequencers to enable more efficient use of the PEs in the array. Each instruction sequencer used to drive the array issues an instruction to be executed only by a certain class of PEs. By utilizing multiple sequencers, multiple programs are able to be processed simultaneously, one for each instruction sequencer.

With a system that has more than one instruction sequencer, two or more streams of instructions can be broadcast into the array. The PEs are classified in two or more classes with each stream of instructions being received by the PEs. Although all of the PEs receive each instruction, the PEs only execute the instruction that applies to their class.

Figure 1:
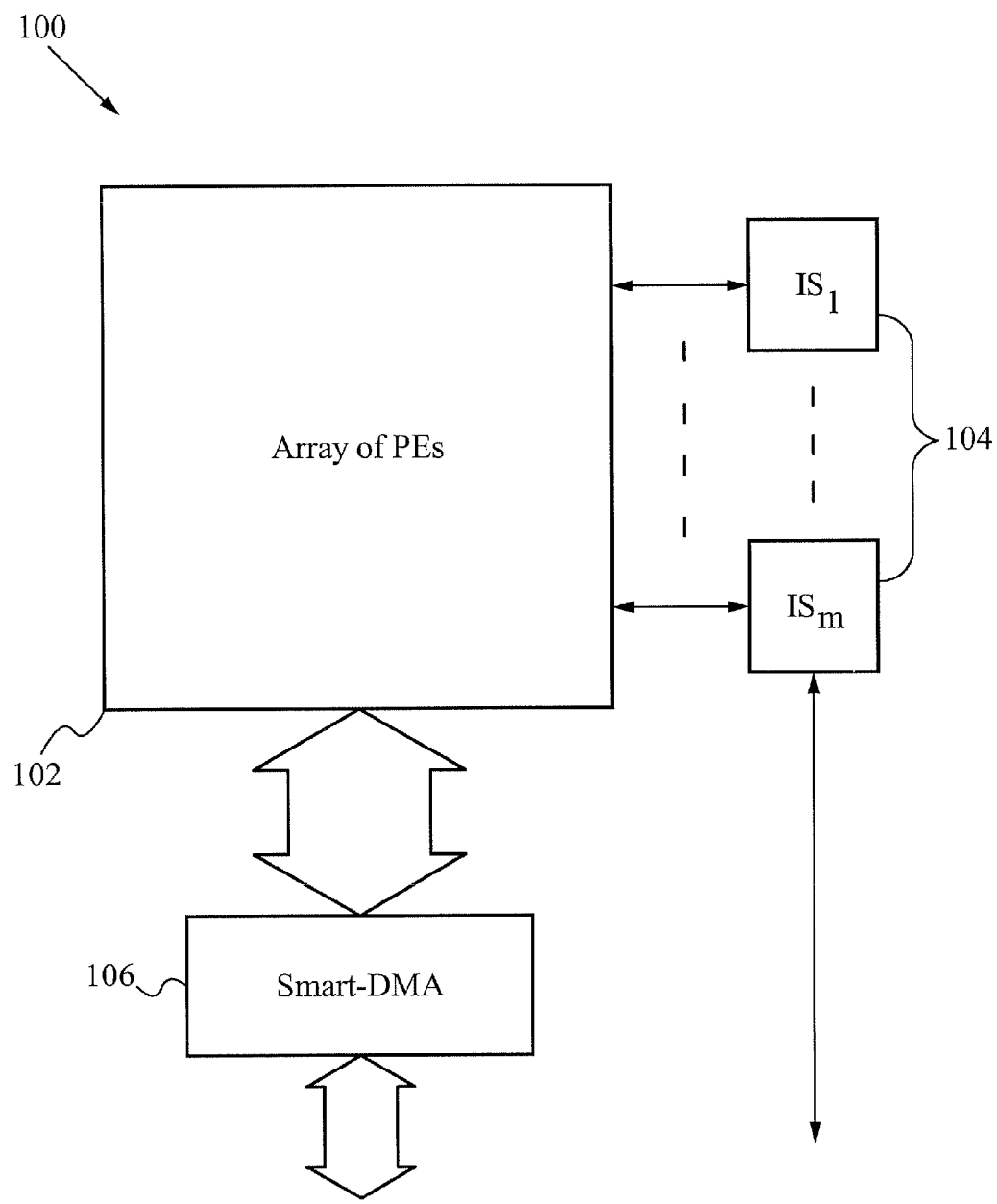
FIG. 1 illustrates a block diagram of a data parallel system with multiple instruction sequencers.

FIG. 1 illustrates a block diagram of a data parallel system 100 with multiple instruction sequencers 104. The data parallel system 100 includes an array of PEs 102 coupled to multiple instruction sequencers 104. The array of PEs 102 is also coupled to a Smart Direct Memory Access (DMA) 106 for data transfer between the array of PEs 102 and a memory. Each of the instruction sequencers 104 is coupled to the array of PEs 102 by a separate bus so that each instruction sequencer 104 is able to send an instruction to all of the PEs within the array of PEs 102 at the same time. The array of PEs 102 are separated into a plurality of classes such that PEs in a first class execute a first instruction from a first instruction sequencer, and PEs in an mth class execute an mth instruction from an mth instruction sequencer. By separating the PEs into different classes, there is more data for each class to process since multiple instructions are being processed at once. Each PE from the array of PEs 102 receives all of the instructions broadcast by $IS_l$ through $IS_m$, but executes only one instruction according with its internal state corresponding to the class.

Figure 2:
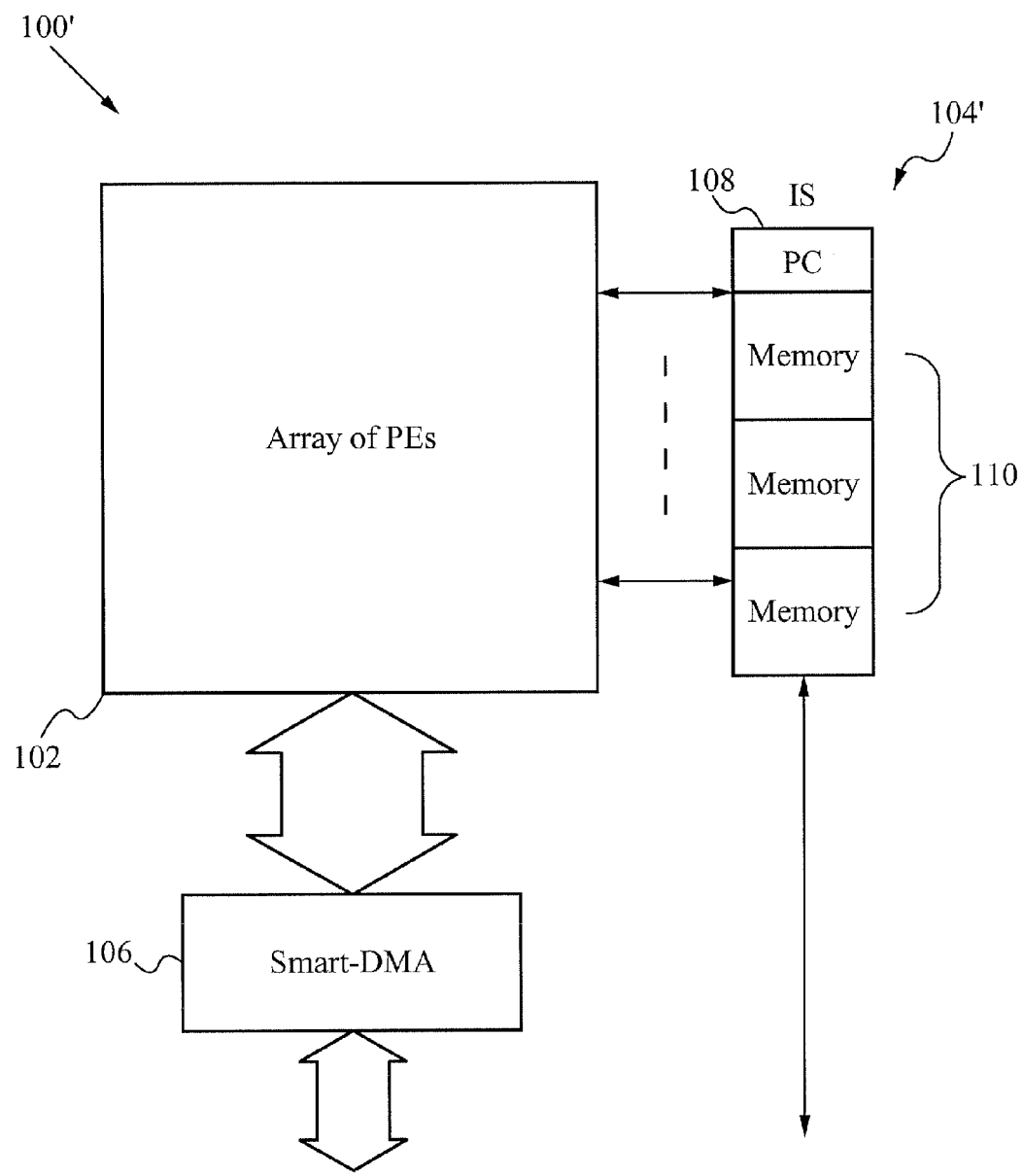
FIG. 2 illustrates a block diagram of a data parallel system with an instruction sequencer sending out multiple instructions.

There are two operational modes associated to the system from FIG. 1. Each instruction sequencer has its own program counter issuing m independent streams of instructions, or only one program counter is activated and all the others are disabled and the m streams of instructions are strongly correlated. FIG. 2 illustrates the second operational mode.

FIG. 2 illustrates a block diagram of a data parallel system 100' with an instruction sequencer 104' sending out multiple instructions. Instead of implementing multiple instruction sequencers as described above, only one sequencer utilizes its program counter (PC) 108 while utilizing the other program memories 110 of other instruction sequencers. The collection of instruction sequencers where only the one program counter 108 is utilized is considered to be the instruction sequencer 104'. The instruction sequencer 104' broadcasts, in each clock cycle, multiple instructions to an array of PEs 102. This is a version of the previous embodiment with only one program counter using all the program memories. The switch between the previous embodiment and this embodiment can be done at clock cycle level by disabling some of the program counters of the instruction sequencers. An intermediary solution is also possible. For example, some instruction sequencers are independent, and other instruction sequencers are grouped under the control of only one program counter. Each PE in the array of PEs 102 executes only the proper instructions according to its internal state. Therefore, each class of PEs is configured to only execute one instruction of the multiple instructions received. The array of PEs 102 is also coupled to a Smart-DMA 106 for data transfer between the array of PEs 102 and a memory.

Figure 3:
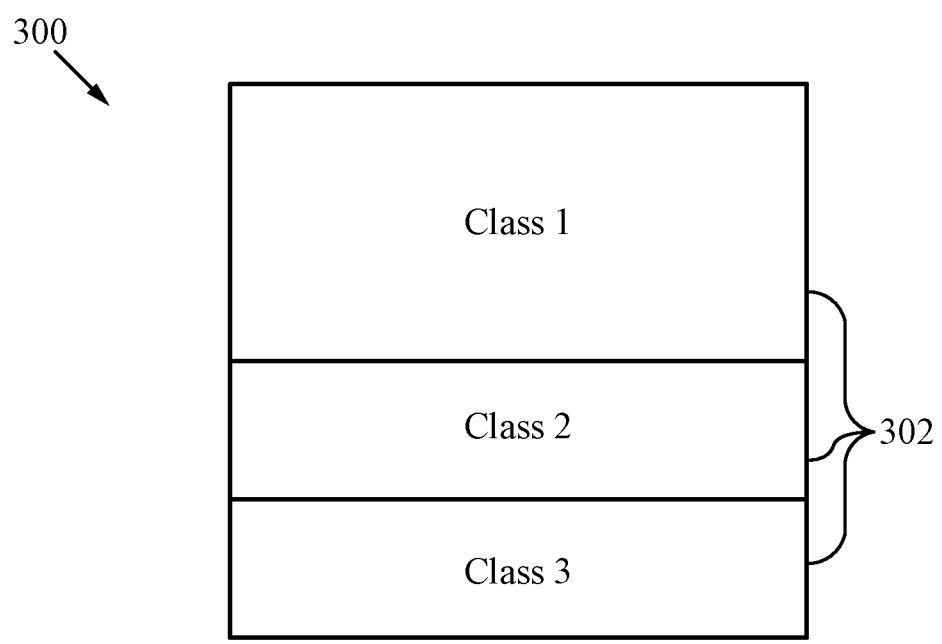
FIG. 3 illustrates a block diagram of an exemplary array of processing elements separated into multiple classes.

FIG. 3 illustrates a block diagram of an exemplary array of processing elements 300 separated into multiple classes 302. The multiple classes 302 in the example include class 1, class 2 and class 3. Class 1 includes half of the processing elements, while classes 2 and 3 each include a quarter of the processing elements. Therefore, class 1 would be dedicated the largest amount of data that needs to be processed while classes 2 and 3 would be used for smaller tasks. Although the example in FIG. 3 illustrates three classes of processing elements, there are able to be any number of classes of processing elements where the number is two or greater. Furthermore, the graphical representation of the array of processing elements 300 and multiple classes 302 appears to show that the processing elements are designated in classes in straight lines and in groups. This specific linear grouping is not required. The classification of processing elements is able to be done in any fashion including a completely random selection of processing elements to be in each group. However, the size of each group is data dependent.

Figure 4:
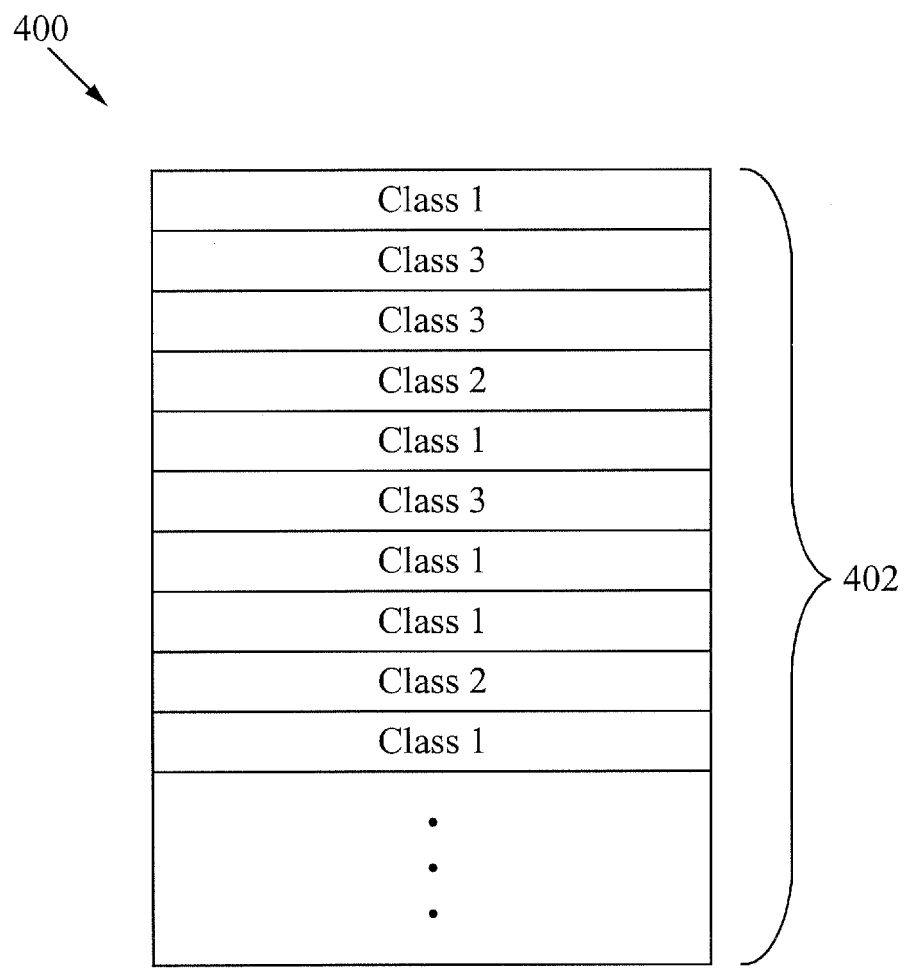
FIG. 4 illustrates a block diagram of an exemplary array of processing elements separated into multiple classes wherein the classes are not contiguous.

FIG. 4 illustrates a block diagram of an exemplary array of processing elements 400 separated into multiple classes 402 wherein the classes are not contiguous. The multiple classes 402 in the example include class 1, class 2 and class 3. As shown, the classes are able to be noncontiguous such that some of class 1 is separated by class 3 and class 2. Similarly class 3 and class 2 are also separated by other classes. The classification of processing elements is able to be done in any fashion including a completely random selection of processing elements to be in each group. However, the size of each group is data dependent. Although the example in FIG. 4 illustrates three classes of processing elements, there are able to be any number of classes of processing elements where the number is two or greater.

Figure 5:
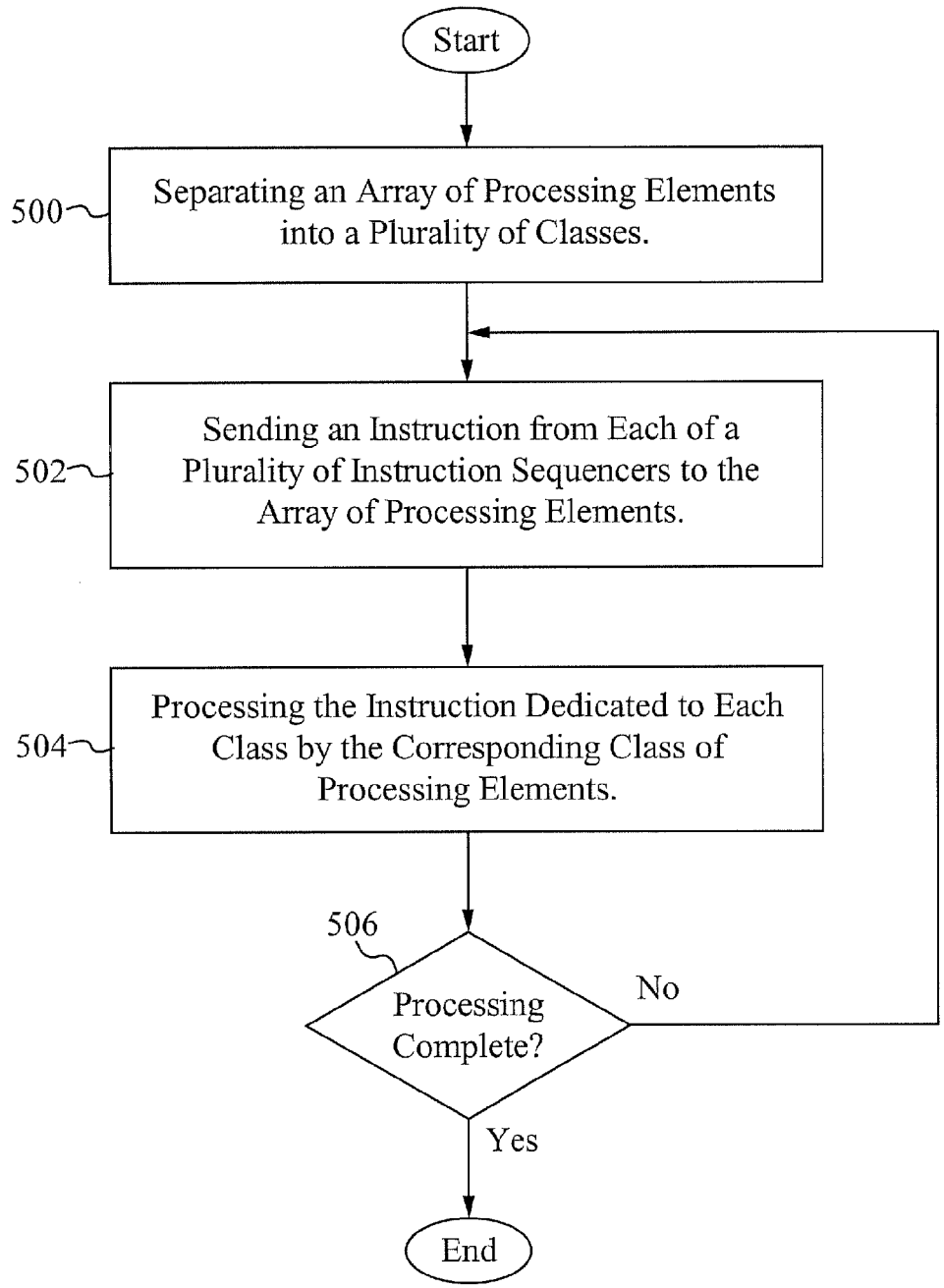
FIG. 5 illustrates a flowchart of processing multiple instructions in an array of processing elements.

FIG. 5 illustrates a flow chart of a process of processing multiple instructions in an array of processing elements. In the step 500, an array of processing elements is separated into a plurality of classes. The processing elements are not physically separated, but they are classified so that each is aware of the class to which it belongs. If the classification of PEs is performed by a local condition in each PE, then there is a flexible way to define the classification and consequently to associate a PE to an instruction sequencer. In the step 502, an instruction is sent from each of a plurality of instruction sequencers to the array of processing elements. Alternatively, when implementing an instruction sequencer with a program counter and multiple memories, the instruction is sent from the instruction sequencer to the array of processing elements. All of the instructions are received by all of the processing elements, but not all of the instructions are processed by all of the processing elements. In the step 504, the instructions are processed based on the class of the instruction and the processing elements such that only instructions that correspond to a processing element's class are processed by that processing element. In the step 506, it is determined if the processing of the instructions is complete. If there are no more instructions to be processed, then the process ends. If there are more instructions to be processed, then the process resumes at the step 502.

The typical use of a parallel array with one sequencer is in the range of 20%-60%. By adding additional instruction sequencers, the use of the array will tend to surpass 90%.

Since the area and power of an instruction sequencer are very small compared with the area and power used by the array, the multi-sequence control is very efficient. By adding a second instruction sequencer, there is only an increase in size by about 10%, but the efficiency of the array is doubled. Furthermore, because the weight of the program memory in each instruction sequencer is dominant versus the control logic, providing the possibility to use one or many program counters becomes a very advantageous feature.

An example of separate multiple tasks to be performed is video with sound. The array of PEs is divided so that a majority of the PEs are directed to handle video and the rest handle sound, since video processing is typically much more intensive than audio processing. Another example is with two streams of data which are encoded in different formats such as h.264 and Moving Picture Experts Group-2 (MPEG-2). One sequencer runs one algorithm, and a second sequencer runs another algorithm.

One reason an array of PEs is not entirely used at once is that there is not enough data to fill up the array. For example, with video processing, the data is preferably processed in a diagonal fashion starting from the top left corner of the screen going to the bottom right corner. Therefore, only a small amount of data is initially processed because the screen size in the top left corner is very small. Then, as the video is processed in the middle of the screen, more data is concurrently processed. There is less data again as the scan gets to the bottom right corner of the screen. Thus, by handling two streams at the same time and offsetting the streams so that a first stream is processing less data in the corner of a screen while a second stream is processing more data in the middle of a screen, a system is capable of maintaining a proper balance between the amount of data in each stream to maximize the efficiency of the PEs by utilizing as many PEs as possible.

With current processor technology, if a processor is not needed, it is possible not to clock the processor and save power. However, in the near future leakage current will be half of the power of the processor and even if it is not clocked, a significant percentage of total power will be consumed. Therefore, to avoid wasting power, as many transistors as possible should be used continuously (e.g. each clock cycle).

To utilize the present invention, PEs within an array of PEs are classified to correspond to instruction sequencers. The instruction sequencers send data to be processed by the PEs. Each class of PEs executes the set of instructions that correspond to their class. When in use for data processing, by classifying PEs and utilizing multiple instructions, the processing efficiency of the array of PEs is greatly improved.

In operation, a data parallel machine includes an array of PEs. Multiple instruction sequencers are coupled to the array of PEs to broadcast instructions to all of the PEs within the array of PEs. Although not each PE executes each instruction, each PE receives each instruction. Each PE is classified (e.g. class 1, 2, 3), and instructions are executed based on the class. The instructions are executed according to the internal state of each PE. For example if a first set of PEs are designated class 1 and a second set of PEs are designated class 2, the first set of PEs execute instructions from instruction sequencer 1 and the second set of PEs execute instructions from instruction sequencer 2.

As described above, all of the instructions are received by each PE, but each PE selects the instruction to be executed according to its class. There does not need to be a uniform, contiguous or adjacent distribution of PEs which can be random. For example, with two classes, it is possible to have class 1 with 70% of the PEs and class 2 with 30% of the PEs. By classifying PEs into different classes, it is possible to designate more PEs to work on a more intensive task and other PEs to work on less intensive task. Furthermore, the size of each class is able to be varied in some embodiments. For example, if initially class 1 requires 60% of the PEs but later needs 80%, the system is able to switch some of the PEs from another class to class 1 to provide the 80%.

There are many uses for the present invention, in particular where large amounts of data is processed. The present invention is very efficient when processing complex data such as in graphics and video processing, for example HDTV and HD-DVD.

The present invention has been described in terms of specific embodiments incorporating details to facilitate the understanding of principles of construction and operation of the invention. Such reference herein to specific embodiments and details thereof is not intended to limit the scope of the claims appended hereto. It will be readily apparent to one skilled in the art that other various modifications may be made in the embodiment chosen for illustration without departing from the spirit and scope of the invention as defined by the claims.

What is claimed is:

1. A system for processing data, the system comprising:
   a set of processing elements, separated into a plurality of classes, including a first class, a second class and a third class, wherein the first class comprises a first half of the processing elements, the second class comprises a first half subset of a second half of the processing elements and the third class comprises a second half subset of the second half of the processing elements; and
   a plurality of sequencers coupled to the set of processing elements wherein each of the plurality of sequencers sends a respective instruction to each processing element of the set of processing elements, and wherein a particular processing element executes the respective instruction only if the respective instruction corresponds to a class the particular processing element is in, wherein the class the particular processing element is in depends on a local condition within the particular processing element.

2. The system as claimed in claim 1 further comprising a Smart-Direct Memory Access (Smart-DMA) circuit for transferring data between the set of processing elements and a memory.

3. The system as claimed in claim 1 wherein the system is configured to switch a portion of the processing elements from one class to another class.

4. The system as claimed in claim 1 wherein each of the plurality of sequencers is able to run a different algorithm.

5. The system as claimed in claim 1 wherein a size of each of the plurality of classes is variable.

6. The system as claimed in claim 1 wherein the first class of processing elements is for processing a larger amount of data.

7. The system as claimed in claim 1 further comprising a first sequencer of the plurality of sequencers, the first sequencer with a program counter and a plurality of memories coupled to the set of processing elements, wherein the first sequencer sends multiple instructions to the set of processing elements.

8. The system as claimed in claim 1 wherein each of the plurality of classes is not contiguous.

9. A system for processing data, the system comprising:
   a set of processing elements separated into a plurality of classes, including a first class, a second class and a third class, wherein the first class comprises a first half of the processing elements, the second class comprises a first half subset of a second half of the processing elements and the third class comprises a second half subset of the second half of the processing elements; and
   a sequencer coupled to the set of processing elements wherein the sequencer sends multiple instructions to the set of processing elements, wherein each processing element is configured to receive each instruction of the multiple instructions and executes a particular instruction only if the particular instruction corresponds to a class the processing element is in, wherein the class a particular processing element is in depends on a local condition within the particular processing element.

10. The system as claimed in claim 9 wherein the sequencer further comprises a program counter and a plurality of memories.

11. The system as claimed in claim 9 further comprising a Smart-Direct Memory Access (Smart-DMA) circuit for transferring data between the set of processing elements and a memory.

12. The system as claimed in claim 9 wherein the system is configured to switch a portion of the processing elements from one class to another class.

13. The system as claimed in claim 9 wherein the sequencer comprises a program counter and a plurality of memories coupled to the set of processing elements.

14. The system as claimed in claim 9 wherein a size of each of the plurality of classes is variable.

15. The system as claimed in claim 9 wherein the first class of processing elements is for processing a larger amount of data.

16. The system as claimed in claim 9 further comprising a plurality of sequencers coupled to the set of processing elements wherein each of the plurality of sequencers sends a respective instruction to the set of processing elements.

17. The system as claimed in claim 9 wherein each of the plurality of classes is not contiguous.

18. A method of processing data, the method comprising:
classifying a set of processing elements in a plurality of classes, including a first class, a second class and a third class, wherein the first class comprises a first half of the processing elements, the second class comprises a first half subset of a second half of the processing elements and the third class comprises a second half subset of the second half of the processing elements;
sending a respective instruction from each of a plurality of instruction sequencers to each processing element of the set of processing elements; and
processing the respective instruction by a corresponding class of processing elements in the set of processing elements, wherein the class each particular processing element is in depends on a local condition within that particular processing element.

19. The method as claimed in claim 18 further comprising sending the respective instruction from a first instruction sequencer of the plurality of instruction sequencers to the set of processing elements, wherein the first instruction sequencer includes a program counter and multiple memories.

20. The method as claimed in claim 18 further comprising transferring data between the set of processing elements and a memory utilizing a Smart-Direct Memory Access (Smart-DMA) circuit.

21. The method as claimed in claim 18 wherein a size of each of the plurality of classes is variable.

22. The method as claimed in claim 18 wherein each of the plurality of classes is not contiguous.

* * * * *